United States Patent [19]
Parker

[11] 3,827,301
[45] Aug. 6, 1974

[54] FIN COOLED TEMPERATURE SENSOR EMPLOYING LIQUID CRYSTALS

[75] Inventor: Robert Parker, Danville, Calif.

[73] Assignee: Robert Parker Research, Inc., Livermore, Calif.

[22] Filed: Sept. 18, 1972

[21] Appl. No.: 290,199

[52] U.S. Cl. .............................. 73/356, 116/114.5
[51] Int. Cl. ........................................... G01k 11/16
[58] Field of Search ....... 73/356, 362.8; 23/230 LC; 252/408; 219/242; 116/114.5, 114 V; 248/359

[56] References Cited
UNITED STATES PATENTS

| | | | |
|---|---|---|---|
| 2,086,102 | 7/1937 | Stradling | 219/242 |
| 2,355,883 | 8/1944 | Mathews | 248/359 |
| 3,524,726 | 8/1970 | De Koster | 73/356 |

Primary Examiner—Richard C. Queisser
Assistant Examiner—Denis E. Corr

[57] ABSTRACT

An apparatus is provided for indicating the temperature of a surface or heat source by employing a single liquid crystal composition which is at varying distances from the surface. A first means is provided for heat exchanging with said surface. A second means is provided for heat exchanging with the ambient environment, with the first and second means in heat exchanging relationship. At least a portion of said second means is coated with a liquid crystal composition extending away from said first means. The apparatus is useful in combination with appliances or apparatii which are at elevated temperatures, particularly those which reach temperatures in excess of that which burns the skin, such as wood burning tools, soldering irons, electric ranges, conduits for high temperature fluids, and the like.

8 Claims, 5 Drawing Figures

PATENTED AUG 6 1974 3,827,301
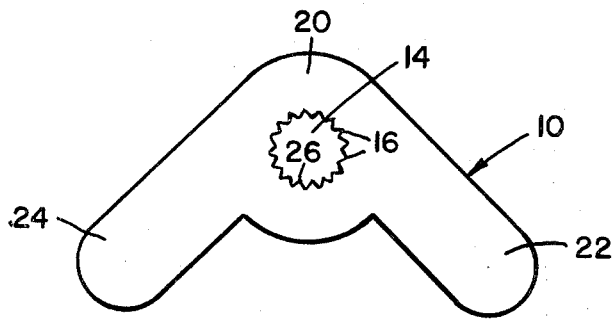
FIG_1
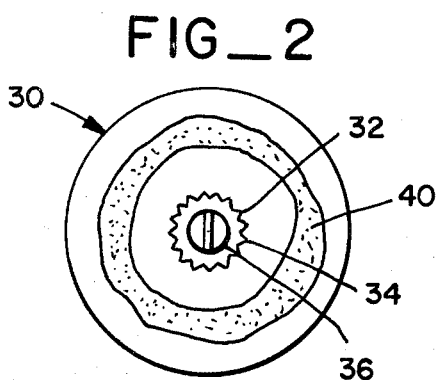
FIG_2
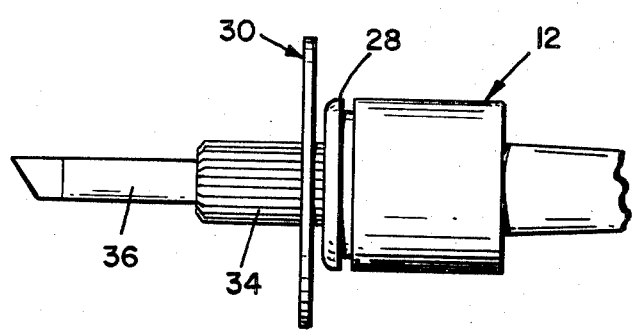
FIG_3
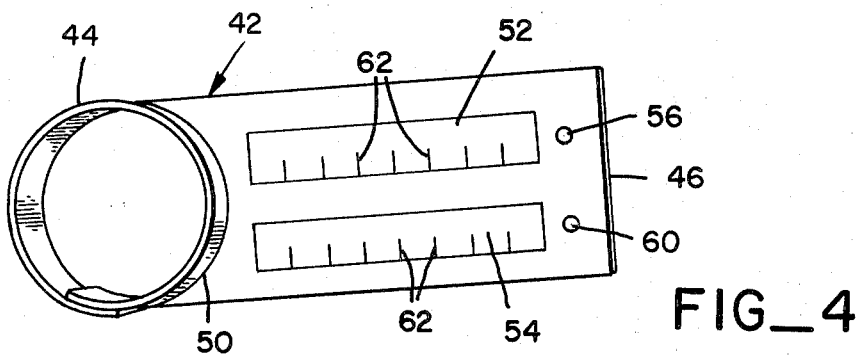
FIG_4
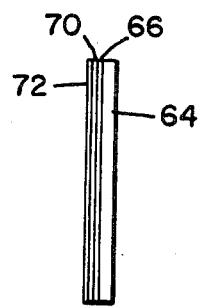
FIG_5

FIN COOLED TEMPERATURE SENSOR EMPLOYING LIQUID CRYSTALS

BACKGROUND OF THE INVENTION

1. Field of the Invention

Appliances employed for heating are hazardous, since it frequently is not apparent from looking at the appliance whether it is hot or cold. Therefore, there is a continuing danger while the appliances are on or shortly thereafter, that someone may contact the appliance and be burned, or the appliance may be left in contact with a heat-destructible material, destroying or marring the surface of the material. While one can employ a number of available warning devices, for the most part these devices are expensive, and uneconomic. Thus, the use of the appliance has required the need to exercise extreme caution.

There is also a frequent need to determine whether a conduit is hot or cold in order to determine whether a system is operative, whether the conduit may be replaced, or the like. While thermocouples can be employed and accurate determinations made of the temperature of the conduit, in many instances, it is desired to have an inexpensive method for continuously monitoring the temperature of the conduit or a mobile, durable, rapid means of temperature determination.

2. Description of the Prior Art

The use of temperature responsive liquid crystal material for thermometric purposes may be found in British Pat. No. 1,138,590 and U.S. Pat. No. 3,440,882. Temperature responsive liquid crystals are commercially available from Liquid Crystal Industries, Turtle Creek, Pa. and Hoffman-LaRoche, Nutley, N.J.

SUMMARY OF THE INVENTION

An apparatus is provided for determining the temperature of a surface by having first and second heat exchange means, where the two heat exchange means are in heat exchanging relationship and the first heat exchange means is small as compared to the second heat exchange means. The first heat exchange means is for heat exchange with the surface whose temperature is to be determined. The second heat exchange means is for heat exchange, by convection or radiation with the environment.

At least a portion of said second heat exchange means is coated with a band of a liquid crystal composition, the band extending away from said first heat exchange means, so as to have the liquid crystal composition at varying distances from the surface. By appropriate choice of materials, in relationship to the temperatures which are to be encountered, the distance from the first heat exchange means at which the liquid crystal composition undergoes its transition can be a measure of the temperature of the surface being measured.

BRIEF DESCRIPTION OF THE DRAWINGS

FIG. 1 is a plan view of a thermal indicator stand for a wood burning tool.

FIG. 2 is a front view of a thermal indicator disc mounted on a wood burning tool.

FIG. 3 is a side view of a thermal indicator disc mounted on a wood burning tool.

FIG. 4 is a perspective view of a thermal indicator plate mounted on a conduit clamp.

FIG. 5 is an expanded side view of the disc depicted in FIG. 2.

DESCRIPTION OF THE SPECIFIC EMBODIMENTS

The subject invention comprises a thermal indicator for determining the temperature of a surface by relating the temperature of the surface to the temperature gradient along an element, usually a thermal nonconductor. A member is provided which, when in contact with the surface, has a temperature gradient extending away from the surface. A continuous or discontinuous band of a liquid crystal composition is placed in contact with said member, so as to extend away from that portion of said member in contact with said surface. The band extends a sufficient distance, so that at some temperature of the heat source, there will be a temperature gradient established where portions of the band will be above, below and between the upper and lower transition temperatures of the liquid crystal composition. By appropriate choice of the liquid crystal composition and the materials employed for the member, the distance from said surface at which the liquid crystal composition undergoes its transition, provides an indication of the temperature of the surface.

In fabricating the apparatus, a sheet of flexible or rigid material will normally be employed. The material may be thermally-conducting or relatively non-conducting, although a perfect insulator cannot be employed. The material is chosen so as to provide a reasonable temperature gradient for a desirable distance in a direction extending from some point or area. Normally, a relatively thin sheet will be employed, which has sufficient strength to retain its conformation. Usually the sheet will be about 1/64 inch to ¼ inch in thickness, preferably 1/32 inch to 1/16 inch.

Various materials can be used such as plastic, metals, metal alloys, ceramics, cermets, and the like. Normally, the higher the temperature encountered at the surface, the less thermally conducting will be the material employed as the base. While usually a single material will be used for the two heat exchanging members, in some instances it may be desirable to have two different materials, for example, a soft thermally conducting material to provide good heat exchange with the surface, and a rigid, relatively non-conducting material to interact with the environment.

The thermal indicator of this invention can be considered to be divided in two parts. The first part is for heat exchange with the apparatus, appliance, conduit, or the like. The temperature of the surface can be measured, by direct or indirect contact with the surface. That is, the first portion may be contacted with the appliance or the like, or means may be provided for transferring heat from the surface to be measured and the surface heat exchange portion of the thermal indicator brought in contact with this means. Such means may include copper wires, heat pipes, fibers, and the like. Heat pipes are described in U.S. Pat. No. 3,229,759. The significant factor is that the surface heat exchanging portion of the thermal indicator provides an efficient transfer of heat from the surface to be measured to the thermal indicator.

The second portion of the thermal indicator or environment exchanger is in heat exchange relationship with the first portion. Normally, the second portion will be large both in volume and surface area as compared to the first portion. In effect, the second portion serves as a fin interacting with and being cooled by the environment. In this manner, a temperature gradient exists extending from the contact with the first portion away from the first portion. The first portion need only be a surface of a plate, such as an outer edge, with the second portion being the remainder of the plate.

Mounted on the second portion in heat exchanging relationship thereto will be a liquid crystal composition extending away from the first portion in at least one direction. Therefore, the liquid crystal composition will respond to the thermal gradient in the second portion. As the temperature increases or decreases at the thermal source surface, the temperature gradient in the second portion will vary as the distance from the first portion. The position at which the transition temperature for the liquid crystal composition occurs will directly relate to the temperature gradient of the second portion. Thus, with a liquid crystal composition having a transition temperature substantially in excess of room temperature, as the temperature of the surface increases, the liquid crystal composition will undergo its lower transition farther and farther away from the surface. Therefore, at some distance from the first portion there will be a visible band, where the temperature of that part of the temperature gradient is between the upper and lower transition temperatures of the liquid crystal composition. Between the visible band and the heat source the temperature will be above the upper transition temperature of the liquid crystal composition. On the side of the band away from the heat source, the temperature will be below the lower transition temperature of the liquid crystal composition.

The transition of the liquid crystal composition is characterized by going from a transparent form to a visual form which undergoes a number of color changes until it undergoes a second transition and returns to the transparent form. Thus, with a single liquid crystal composition extending away from the surface or heat source, one would obtain a section of color at some distances from the heat source, indicating the temperature of the heat source. Of course, the section of color merely provides an attractive and aesthetically pleasing appearance, but is not necessary to the operation of this invention. All that is required, is that at the transition, the liquid crystal composition undergo a change from a transparent form to a visual form.

The liquid crystal composition may be applied as a tape to the second portion or may be formed directly on the second portion as desired. The manner of forming the liquid crystal composition as a band to measure temperature will be described subsequently.

As already indicated, the subject apparatus can be employed with a wide range of apparatii, appliances, conduits and the like, and in a wide range of environments. In most applications, there must be a substantial differential between the ambient temperature and the temperature of the surface to be measured. There is no particular shape, size, or structure of the apparatus. Rather, the apparatus will be devised in relationship to the environment in which it is to operate. The apparatus can be in the shape of a disc, plate, bar, tube, or the like. Depending on the accuracy of the temperature determination desired, the heat exchange efficiency can be varied greatly.

For quantitative temperature determinations, it is desirable that convection currents be minimized. The heat can then be dissipated by radiation, rather than convection. The second portion can be protected from air currents by various insulating means, such as a transparent coating of an insulating material, an evacuated casing, or the like.

For a further understanding of the subject invention, the drawings will now be considered. In FIG. 1 is one embodiment of the subject invention, which shows a stand for an electrical resistance heated tool 12, shown in part in FIG. 3. Such tools include wood burning tools, soldering irons, and the like. The stand 10 has an opening 14 with inner serrated wall 16. The serrations are to conform with the serrations at the surface of the ceramic outer cover in a wood burning tool.

The stand can have a thickness of about one thirty-second to one-sixteenth of an inch. The thickness will be sufficient to provide the desired dimensional stability to support the wood burning tool, but sufficiently thin to provide the necessary heat exchange relationship, as will be described below.

Extending away and downwardly from a central circular portion 20 are arms 22 an 24. The arms support the wood burning device, as well as act as fins, which provide a thermal gradient from the wood burning tool outwardly, so that the temperature of the stand varies with the distance from the wood burning tool.

With a wood burning tool or soldering iron, the temperature at the surface of the wood burning tool or soldering iron in contact with the inner surface 26 will be much higher than desired for touching or for the liquid crystal compositions. Since the stand is quite small, a relatively poor heat conducting material will be used to provide the desired gradient. Convenient plastic materials may be employed which have thermal conductivities in te range of about 0.1 to 0.2 BTU/Hour ft °F. For the most part, the liquid crystal compositions are stable below 300° and microencapsulated liquid crystal compositions are stable below about 120°C. Therefore, the material employed for the stand should provide the desired temperature drop between the surface of the tool 12 in contact with the inner surface 26 of the stand, with which the tool is in heat exchanging relationship.

The stand is fabricated from a single material. The inner surface 26 is formed so as to provide good contact with the heating element of the tool. In this way, satisfactory heat exchange can be achieved. After fabricating the stand, one can introduce the tool into the stand and empirically determine the temperature gradient emanating outwardly from the heating element. One can then choose an appropriate liquid crystal composition which will have a transition range at the desired temperature.

Because of the nature of liquid crystal compositions, they are normally coated onto a dark, usually black, surface. The black surface may be inherent in the material employed for the stand, or may be a thin coating of a black ink or paint. The entire stand on one or both sides may then be coated with one or more, usually just one, liquid crystal composition having the appropriate transition temperature. Although not required, a protective coating can then be applied, so as to protect the liquid crystal composition from abrasion or other mechanical removal.

When the wood burning tool is introduced into the stand and plugged in, the heating element will heat up, heating the stand. The stand is usually positioned about ⅛ inch from the guard 28, since this tends to be a cooler portion of the heating element. Probably, the area of the stand in the immediate vicinity of the inner surface 26 will be too hot for the liquid crystal composition, and destroy the composition. However, this is of no concern, and will merely result in a small band around the inner surface 26 which will not be temperature responsive.

As the temperature of the stand increases, the transition temperature of the liquid crystal composition will be reached at a position near the inner surface 26. When the liquid crystal composition reaches its lower transition temperature, it will go from transparent to colored, usually blue. As the temperature increases, the lower transition temperature will be achieved farther and farther away from the inner surface 26, so that as the temperature of the liquid crystal composition rises, the liquid crystal composition will change from blue to white and then become transparent again. In effect, one can observe a colored section moving farther and farther away from the heat source, until equilibrium is achieved.

By providing for some indicia on the stand, as to when the tool is ready for use, the user can determine when the wood burning or other tool has reached the appropriate temperature. This may be at equilibrium or below the equilibrium temperature. The tool may be used with the stand on the tool, since the stand is small and will normally not interfere with the operation of the tool, or the stand may be removed from the tool, when the tool is in use.

When the tool is turned off, the tool and stand will begin to cool. The borders for the transition temperatures of the liquid crystal composition will begin to move toward the tool. When the tool is sufficiently cool, either the temperature of the entire stand will be below the lower transition temperature of the liquid crystal composition, or only a portion of the stand close to the inner surface 26 will be above the liquid crystal composition's lower transition temperature. Therefore, the user is informed that the tool is now safe for touching and may be safely stored.

Instead of the stand, since the size of the stand may obscure the work product during the operation, a small disc 30 may be employed. The disc is depicted in FIGS. 2 and 3. The disc will have inner surface 32 which contacts the jacket 34 of the heater element 36 of the wood burning tool, soldering iron and the like. When the heating element is on, the disc 30 will be heated and a band 40 of the liquid crystal composition will be visible. When the heating element is off, and cold, the band 40 will disappear and the disc 30 will have a black appearance. The disc 30 will operate in substantially the same manner as the stand 10, but will be somewhat more qualitative in its temperature relationship, since it normally will not provide as great a distance through which a temperature gradient may be formed.

As already indicated, the use of a temperature gradient to measure temperature with a single liquid crystal composition can be applied in many other situations than wood burning tools or other small hand heating appliances. In FIG. 4, a conduit temperature measuring device 42 is depicted. The device has a metal clamp 44, which can be clamped to a conduit not shown. Mounted on the clamp 44 is a plate 46 whose side edge 50 conforms to the shape of the clamp 44.

The metal clamp will act as a heat transfer between a conduit and the heat exchange surface 50 of the plate 46. The plate 46 may be joined to the clamp 44 by adhesive which will have sufficient heat transfer capability to transfer heat through the plate 46. The adhesive must also be able to withstand the temperature to which it is exposed.

On the plate 46 two temperature scales 52 and 54 are provided which are strips of the same or different liquid crystal compositions. The purpose of these scales is to provide a semi-quantitative or quantitative determination of the temperature of the conduit. It should be recalled that the temperature determination is based on the rate of cooling from the heat exchange surface 50 outwardly away from this surface. The rate of cooling will depend on the ambient temperature of the environment. The lower the ambient temperature, the more rapidly will the plate 46 cool. Thus, one could provide a formula relating the temperature of the heat source to the distance from the heat source at which the liquid crystal transition temperature occurs and the ambient temperature. For small changes in the ambient, there will probably be only insignificant effects on the response of the plate 46 to the temperature source.

In the embodiment depicted, two scales are provided 52 and 54, each scale having its own indicator 56 and 60, respectively. The two scales can be differentiated by using different liquid crystal compositions, by having two different materials for the plate, or other convenient means which will vary the response with a change in the ambient temperature. Alternatively, with the same compositions, the values at the same distance from the heat source can be different. Indicators 56 and 60 will be liquid crystal compositions which will either be insulated from the plate 46 or sufficiently far from the heat source so as not to be affected by the temperature of the heat source.

Relatively large temperature range liquid crystal compositions would be employed for the indicators, so that the range of temperatures encountered normally for the ambient would be covered by the indicators. Thus, in an environment which would undergo relatively wide fluctuations in temperature, one could have one liquid crystal composition which would have a temperature range up to about 60°F and the other liquid crystal composition which would have a temperature range above 60°F. Depending on which of the indicators 56 and 60 was visible, one would then read that scale. Also, since the liquid crystal compositions undergo color changes through their range, one could make minor qualitative adjustments in the temperature which is read, depending on the color of the indicator.

These scales 52 and 54 would have a plurality of lines 62, with temperatures associated with the lines, much like the normal thermometer. Therefore, one could read the temperature of the conduit directly by choosing some particular color phase of the liquid crystal composition as the temperature indicator. For example, one could choose the border at which the liquid crystal composition became visible or the position at which the liquid crystal composition assumed a somewhat white appearance, or any other choice as desired. The choice can be quite arbitrary and will be chosen in order of convenience and ease of observability.

In preparing the various devices for use in the subject invention, either the device may be initially coated and then fabricated or the device may first be fabricated and then coated. As already indicated, the particular material used as the base material can be varied very widely. Conveniently, a number of plastic materials may be used, such as fiberglass impregnated epoxy, polysulfones, polyimidazoles, and the like. Also, ceramics and cermets may be employed. In some instances, good temperature conductors can be employed, such as metal. This could be desirable, particularly when the fin is to be extended a significant distance from the heat source. In this manner, one could obtain a sizable gradient across the fin. Alternatively, one could conduct the heat from the heat source to be measured to the thermal indicator. Heat conductors include heat pipes, copper wire, and the like.

In some instances, it may be desirable to pre-prepare a tape which may then be mounted onto the base material. A tape can be conveniently prepared by employing a transparent thin film, such as ethylene polyterephthalate. The tape may then be coated with the desired liquid crystal composition, either one or more, and allowed to dry. Any liquid crystal composition can be used which has the desired transition temperature. Both microencapsulated and non-encapsulated liquid crystal composition is coated on to the film as a slurry and allowed to dry. The liquid crystal composition is then coated with a black or dark backing, particularly a black ink or paint. Adhesive may then be applied to the dark surface either directly or by means of an adhesive backing and the tape then applied to the base material. The adhesive must be chosen so as to be stable at the temperatures of interest, and provide efficient heat transfer between the base material and the liquid crystal composition. For a more thorough description of a preparation of a liquid crystal composition tape, see co-pending application Ser. No. 263,064, filed by Robert Parker on June 15, 1972, entitled "Digital thermometer."

Alternatively, the liquid crystal composition may be applied directly to a dark base material or a base material covered with a black ink or paint. In FIG. 5 the base 64 is depicted as having a thin coating of a black paint or ink 66. Onto the dark coating is a thin coating of a liquid crystal composition 70. The liquid crystal composition may be applied by dipping, painting, spraying, brushing or the like. The particular mode is one of convenience to insure the desired thickness and uniformity of the coating of the liquid crystal composition. If desired, a protective coating 72 will be provided which is a thin transparent film. The film can be pre-prepared and applied to the liquid crystal composition, or usually a solution of a plastic material in an inert solvent sprayed onto the liquid crystal composition and the solvent allowed to evaporate to provide the protective coating. Various films or film forming materials may be used, such as polyethelene terphthalate.

The subject invention provides a convenient, economic, adaptable thermal indicator for use in a wide variety of applications. In any situation where a heat or thermal source is created, and a heat sink is available, such as by an ambient environment at a lower temperature, the thermal indicator can assume a wide variety of shapes and conformations and can be directly or indirectly attached to the thermal source. Furthermore, the thermal indicator gives a visual warning when something is hot or a visual indication when an apparatus or appliance is at a temperature at which it can be used.

The thermal indicators may be modified so as to give qualitative, semi-quantitative or substantially quantitative temperature measurements. One or more liquid crystal compositions can be employed so as to accommodate very wide ranges of termperatures. In this manner, relatively short thermal gradients can be used by varying the transition temperatures of the various liquid crystal compositions. The apparatus of this invention can be easily fabricated and can be adapted to fulfill other fundtions, such as a stand for a wood burning tool or soldering iron.

Although the foregoing invention has been described in some detail by way of illustration and example for purposes of clarity of understanding, it will be obvious that certain changes and modifications may be practiced within the scope of the appended claims.

What is claimed:

1. A thermal indicator for hand appliances having an elongate heating element comprising:
    a disc supported by two legs extending outwardly and downwardly from said disc, said disc having a central opening for mounting on said elongate heating element in heat exchanging relationship, at least one side of said disc and legs coated with a liquid crystal composition, extending away from said opening, said disc having a thickness of from about 1/64 inches to ¼ inches and being comprised of a heat stable and insulative plastic material, whereby said coated disc provides both a temperature indicator and a support for said appliance.

2. A thermal indicator according to claim 1, wherein said elongated heating element is an electrical resistance heating element of a hand appliance.

3. A thermal indicator according to claim 1, wherein said disc is of from about 1/32 inches to 1/16 inches in thickness.

4. A thermal indicator according to claim 1, wherein said plastic material has a thermal conductivity in the range of about 0.1 to 0.2 B.T.U. per hour per foot per °F.

5. A thermal indicator according to claim 1, wherein said legs are in coplanar relationship with said disc.

6. A thermal indicator for indicating the temperature of a heat source, wherein the environment of said thermal indicator is below the temperature of said heat source comprising:
    means for heat exchanging with said heat source;
    in heat exchanging relationship with said heat exchanging means, an elongate member of a poor heat conductor;
    coated onto said elongate member at least two strips of at least one liquid crystal composition extending away from said heat exchanging means; and
    means for indicating the temperature of the ambient environment in juxtaposition to said elongate member and distant from said thermal source.

7. A thermal indicator according to claim 6 including:
    numerical indicia in juxtaposition to at least one of said strips, said indicia of increasing value with increasing distance from said heat exchanging means.

8. A thermal indicator according to claim 6, including:
    ambient temperature indicators adjacent to the end of each of said strips comprised of a liquid crystal composition having a transition temperature to indicate the use of the adjacent strip as the thermal indicator.

* * * * *